US011226799B1

(12) United States Patent
Sundaresan et al.

(10) Patent No.: US 11,226,799 B1
(45) Date of Patent: Jan. 18, 2022

(54) DERIVING PROFILE DATA FOR COMPILER OPTIMIZATION

(71) Applicant: International Business Machines Corporation, Armonk, NY (US)

(72) Inventors: Vijay Sundaresan, North York (CA); Andrew James Craik, North York (CA); Mark Graham Stoodley, Ontario (CA); Daniel Heidinga, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/007,577

(22) Filed: Aug. 31, 2020

(51) Int. Cl.
*G06F 8/41* (2018.01)
*G06F 16/245* (2019.01)
(Continued)

(52) U.S. Cl.
CPC .......... *G06F 8/443* (2013.01); *G06F 9/45516* (2013.01); *G06F 11/3466* (2013.01); *G06F 16/245* (2019.01)

(58) Field of Classification Search
CPC .......... G06F 11/3466–3495; G06F 11/36–364; G06F 11/366; G06F 8/41–4443
(Continued)

(56) References Cited

U.S. PATENT DOCUMENTS

| 6,360,360 B1* | 3/2002 | Bates | G06F 8/443 717/130 |
| 8,087,006 B2* | 12/2011 | Bendapudi | G06F 11/3452 717/130 |

(Continued)

FOREIGN PATENT DOCUMENTS

| CN | 101398758 A | 4/2009 |
| CN | 110399133 A | 11/2019 |

OTHER PUBLICATIONS

Wicht, Baptiste, Cache-Friendly Profile Guided Optimization, M.Sc. Thesis, Lawrence Berkeley National Laboratory, 2012, 153 pages, [retrieved on Oct. 12, 2021], Retrieved from the Internet: <URL:https://www.researchgate.net/publication/307545338_Cache-Friendly_Profile_Guided_Optimization>.*

(Continued)

*Primary Examiner* — Geoffrey R St Leger
(74) *Attorney, Agent, or Firm* — Garg Law Firm, PLLC; Rakesh Garg; Michael O'Keefe

(57) ABSTRACT

An embodiment includes requesting, by a compiler responsive to execution of a first code segment, a first profile dataset associated with the first code segment. The embodiment also includes executing, responsive to receiving an indication that the first profile dataset is not available, a querying process that searches other code segments based on specified criteria relating to an attribute of the first code segment. The embodiment also includes receiving a search result from the querying process, where the search result includes a second code segment. The embodiment also includes generating an extrapolated profile dataset based at least in part on the second code segment. The embodiment stores the extrapolated profile dataset in memory associated with the first code segment, and the compiler performs an optimization process on the first code segment using the extrapolated profile dataset.

20 Claims, 10 Drawing Sheets

(51) Int. Cl.
  *G06F 11/34* (2006.01)
  *G06F 9/455* (2018.01)
(58) Field of Classification Search
  USPC ............. 717/127, 128, 130–131, 140–161
  See application file for complete search history.

(56) References Cited

U.S. PATENT DOCUMENTS

| | | | |
|---|---|---|---|
| 8,543,907 | B1 | 9/2013 | Roskind |
| 10,353,679 | B2 | 7/2019 | Mahaffey |
| 2003/0066060 | A1* | 4/2003 | Ford ................... G06F 11/3466 717/158 |
| 2004/0117760 | A1* | 6/2004 | McFarling .............. G06F 8/443 717/101 |
| 2004/0210885 | A1* | 10/2004 | Wang ........................ G06F 8/71 717/158 |
| 2008/0028378 | A1* | 1/2008 | Biswas ..................... G06F 8/36 717/151 |
| 2014/0101641 | A1 | 4/2014 | Staples et al. |
| 2014/0366007 | A1* | 12/2014 | Koltachev ................ G06F 8/53 717/129 |
| 2016/0004518 | A1 | 1/2016 | Sharma et al. |
| 2016/0062878 | A1 | 3/2016 | Westrelin et al. |
| 2017/0315847 | A1* | 11/2017 | Chen ................... G06F 11/3644 |
| 2019/0146766 | A1 | 5/2019 | Sandanagobalane et al. |
| 2020/0192680 | A1 | 6/2020 | Blackstein et al. |

OTHER PUBLICATIONS

Bowman, W., et al., Profile-Guided Meta-Programming, Proceedings of the 36th ACM SIGPLAN Conference on Programming Language Design and Implementation, Jun. 2015, p. 403-412, [retrieved on Oct. 13, 2021], Retrieved from the Internet: <URL:http://dl.acm.org/>.*

International Searching Authority, PCT/CN2021/115034, dated Nov. 26, 2021.

* cited by examiner

US 11,226,799 B1

DERIVING PROFILE DATA FOR COMPILER OPTIMIZATION

BACKGROUND

The present invention relates generally to a method, system, and computer program product for compiler optimization. More particularly, the present invention relates to a method, system, and computer program product for deriving profile data for compiler optimization.

Computer programs are usually written in a programming language that an experienced programmer can readily comprehend and then converted to a machine language understood by computer processors. For many programming languages, a compiler or interpreter translates the computer program into machine language. In general, a compiler will attempt to translate the entire program file at once and report errors at the end of this process, whereas an interpreter will attempt to translate the program file one line at a time and will stop when encountering an error.

For programs written using the Java programming language, the source code is typically first translated into an intermediate language called bytecode, which is then translated into machine code. The primary compiler for Java is Javac, which translates Java source code into bytecode organized in class files. A utility called a class loader then loads the bytecode into a Java Virtual Machine (JVM). A JVM includes an interpreter and a Just-In-Time (JIT) compiler that translate the bytecode and provides the resulting machine code to a computer processor for running the program.

SUMMARY

The illustrative embodiments provide for deriving profile data for compiler optimization. An embodiment includes requesting, by a compiler responsive to execution of a first code segment, a first profile dataset associated the first code segment. The embodiment also includes executing, responsive to receiving an indication that the first profile dataset is not available, a querying process that searches other code segments based on specified criteria relating to an attribute of the first code segment. The embodiment also includes receiving a search result from the querying process, wherein the search result includes a second code segment. The embodiment also includes generating an extrapolated profile dataset based at least in part on the second code segment. The embodiment also includes storing the extrapolated profile dataset in memory such that the extrapolated profile dataset is associated in the memory with the first code segment. The embodiment also includes performing, by the compiler, an optimization process on the first code segment based at least in part on the extrapolated profile dataset. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
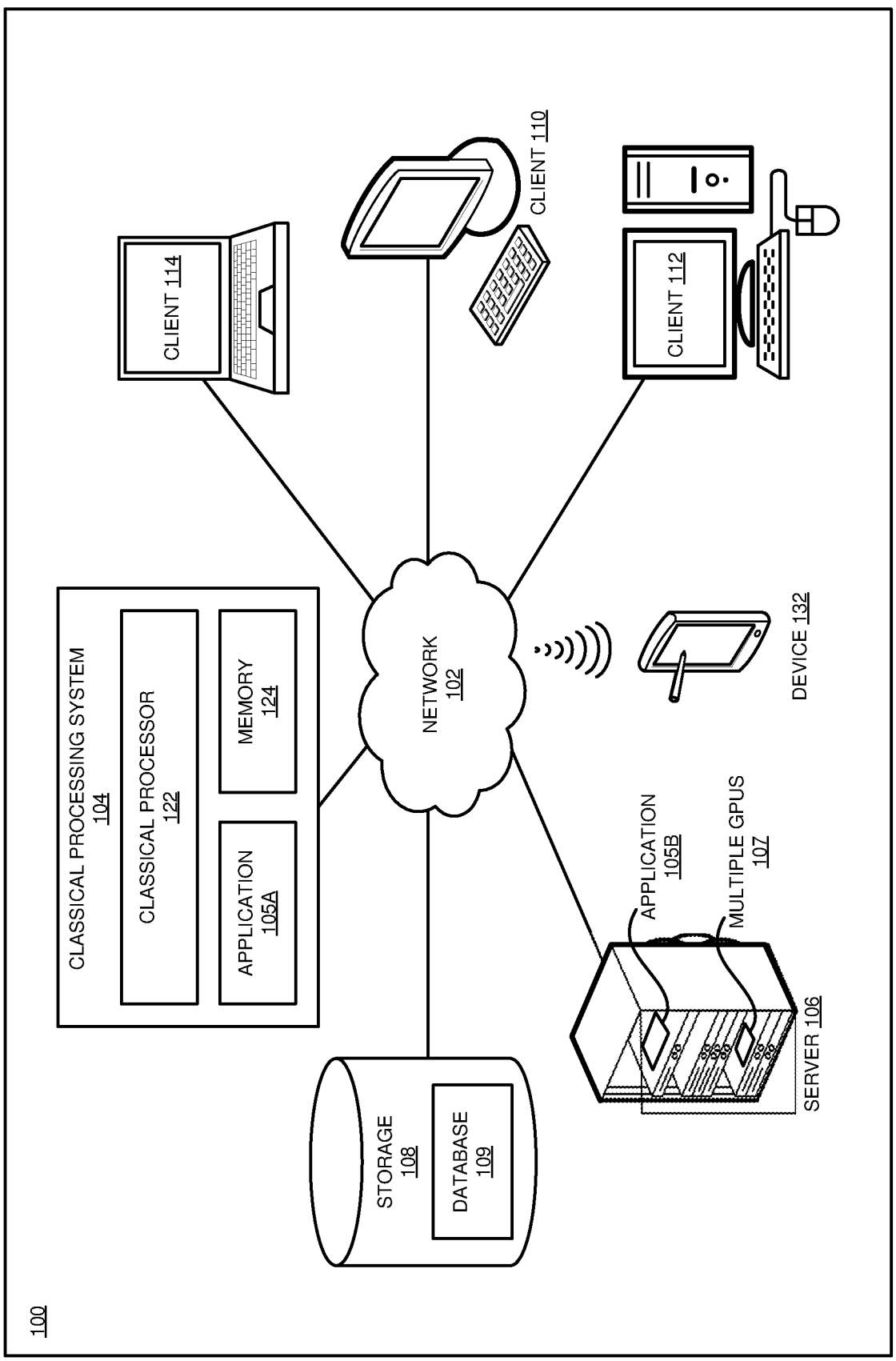
FIG. 1 depicts a block diagram of a network of data processing systems in which illustrative embodiments may be implemented.

Software applications are typically written in source code, which is a high level representation of an application that is convenient for programmers to write and understand. A specialized program is then used to translate an application to another format that a machine can directly execute. These specialized programs may include compilers, interpreters, and hybrid systems that combine elements of compilers and interpreters. However, for convenience, unless otherwise indicated, these specialized programs are simply referred to herein as compilers, and similarly the translating process is simply referred to herein as compiling.

In general, a compiler usually performs the compiling process either before runtime or during runtime. Each of these two options offers certain advantages. For example, runtime compilers allow for portability, automatic memory management, and dynamic loading of code. On the other hand, the processing expense of runtime compilation has the potential to cause diminished performance compared to applications that are compiled before runtime. For this reason, runtime compilers typically also use optimization algorithms to reduce the effects of runtime compilation on program performance.

Optimization algorithms used at runtime commonly include profile-guided optimizations that perform optimizations based on profile data. Profile data typically includes information that summarizes the behavior of an instruction at some profile point in the application being executed. A compiler uses the profile data to determine when and where to compile and optimize code segments, such as methods. For example, in some cases the profile data includes a count of the number of times a particular instruction has been executed by the virtual machine. This count allows the compiler to estimate the frequency of future executions of that code segment. If the count exceeds a threshold value, then the compiler applies an optimization for that code segment. Other types of profile data include information about the types of objects reaching type tests, the targets of a virtual method dispatches, and the lengths of arrays and strings.

Two common techniques for collecting profile data are sampling and program instrumentation. Sampling involves periodically collecting profile data using a timer, whereas program instrumentation involves the use of triggers added to the application, such as a counter increment. When the compiler queries for profile data, it requests such profile data for a specific method and bytecode offset. If profile data has been recorded for the specific method and bytecode offset, it is returned in response to the request. Otherwise, if no profile data is available for the specific method and bytecode offset, a sentinel value representing the absence of profile data is returned to the compiler in response to the request, and as a result, the compiler is unable to perform the intended profile-guided optimization.

Thus, the illustrative embodiments recognize that the lack of profile data hinders a compiler's ability to implement profile-guided optimizations. For example, in the absence of profile information, a compiler will be unable to identify which segments of program code are most frequently executed (e.g., recurring sequence of execution within the program), which hinders runtime performance. Generally, slow runtime performance is undesirable, as it leads to low program throughput, high memory overhead, or other suboptimal behavior. For example, in one test implementation, X86 machines incurred a 40% reduction in peak throughput in the absence of profile information. Thus, if profile information not available for a compiler, significant performance degradation will usually result.

The illustrative embodiments include embodiments that address this challenge by adapting compiler optimization processes to reduce instances where optimization is not performed due to a lack of profile data. Illustrative embodiments recognize that alternative information can be used for compiler optimization when profile data is not available. For example, in the illustrative embodiments, such alternative information includes program state information, such as information from the state of a class hierarchy table, or extrapolated profile information, such as profile information that is extrapolated from other portions of a program. The illustrative embodiments recognize that compiler optimization using such alternative information provides significant performance improvements compared to forgoing optimization due to a complete absence of profile information.

The illustrative embodiments described herein refer to the Java programming language, the Java Virtual Machine ("JVM"), the JIT compiler, the interpreter, and the Java Runtime Environment. However, alternative embodiments are used in conjunction with other programming languages, virtual machine architectures, or runtime environments. Thus, for example, terminology described in Java terms, such as "methods," are interchangeable with other terminology, such as "functions." Furthermore, the term "method" is also synonymous with the terms "class method" and "object method". A method is a set of code which is referred to by name and can be called (invoked) at various points in a program, which causes the method's code to be executed.

In some embodiments, a compiler uses program state information to optimize a code segment in the absence of profile information for the code segment. For example, in some such embodiments, the compiler uses the state of a class hierarchy table to optimize a code segment. An example of such optimization involves a call to a method that is potentially polymorphic, such as a call to a virtual method. For example, in an abstract class "Shape" that has a sub-class "Circle" and another sub-class "Square," Circle implements a virtual method "draw" by generating a display of a circular shape, whereas Square implements the virtual method "draw" generating a display of a square shape. If an array is declared to hold Shape objects and is iterated through with the "draw" method being called on each object, the implementation of each call to the virtual method "draw" will have different results depending on whether the object is a Circle or a Square. In some embodiments, a compiler determines if one particular derived class is usually loaded and optimizes the code segment accordingly. For example, if Square is always loaded or most often loaded, the compiler can inline the Square implementation and inject "guard code" that includes a type test to confirm that the object is Square. If so, the inlined method code can be executed, otherwise the unoptimized virtual method call for another object type is reinstated.

In some such embodiments, a compiler processing a call to such a virtual method accesses data representative of a current state of the class hierarchy table to evaluate whether any of the derived classes have been loaded or instantiated. If the compiler determines that one or more of the derived classes has been loaded but none have ever been instantiated, the compiler inlines only the parent class' implementation of the virtual method since none of the derived classes are viable dispatch targets.

In some such embodiments, the instantiation of the derived classes is tracked by profiling instrumentation at the point of object instantiation. In alternative embodiments, the instantiation of the derived classes is tracked by processing the application heap at the point where a snapshot is being taken. In other alternative embodiments, the instantiation of the derived classes is tracked by combining data regarding which classes were instantiated by which methods (e.g., as tracked in an interpreter) and data from a call graph built up to capture the flow of control from a snapshot point. In such embodiments, the compiler combines the dynamic execution state (e.g., data regarding which classes were instantiated by which methods) with a static analysis (e.g., data from the snapshot point, such as data from a call graph) to produce a substitute for a lack of profiling information at some code location. Having the call graph and doing essentially a reachability analysis with the instantiated classes starting at the code locations where the classes were instantiated would determine which methods an instance of a given class can reach. This context sensitive approach towards using the program state at a snapshot point advantageously filters out instantiated classes that cannot reach a particular program point based on the reachability analysis.

In some embodiments, when a compiler checks for profile information for a particular code segment and determines that profile information is not available, the compiler initiates a querying process that searches for other code segments in the program code that satisfies specified criteria. If the querying process returns a code segment that satisfies the specified criteria, the compiler generates extrapolated profile information using the code segment found by the querying process.

In some embodiments, sometimes referred to herein as syntactic-matching embodiments, the search criteria includes criteria for syntactic matching of the particular code segment. In alternative embodiments, sometimes referred to herein as semantic-matching embodiments, the search criteria includes criteria for semantic matching of the particular code segment. In other alternative embodiments, sometimes referred to herein as context-matching embodiments, the search criteria includes criteria for context sensitive matching of the particular code segment. In further alternative embodiments, the search criteria includes various combinations of syntactic, semantic, and/or context sensitive matching of the particular code segment.

In some syntactic-matching embodiments, a compiler processing a particular code segment for optimization initiates a querying process for path execution frequency information and/or value profile information. In such embodiments, the compiler statically constructs a set of syntactic patterns of interest based on the syntax of a sequence within the particular code segment.

For example, for path execution frequency information, a particular code segment may include the following bytecode sequence:
   aload_0
   instanceof #1 "CustomerName"
   ifeq The compiler would determine if there is any profile information for the ifeq bytecode by querying the bytecode offset and method. If there is no profile information, the compiler searches for other locations in the program code that test an object as being an instance of CustomerName (e.g., other code segments in the program code associated with profile information such as branch bias information for an ifeq fed from an instanceof bytecode). In some embodiments, the compiler performs this search by generating a syntax search criteria that includes a statically constructed set of syntactic patterns of interest like instanceof CustomerName followed by ifeq.

In some embodiments, the compiler assigns a unique identifier to each such sequence. Whenever a class is loaded, the compiler scans its bytecode for matches against the set of patterns and stores the method and bytecode offset for any pattern match into a map data structure keyed on the pattern's unique identifier, where the map data structure holds tuples of methods and bytecode offsets that match respective keyed patterns. In some such embodiments, the compiler then looks up the pattern id for the case where profile information is not available and then checks for profile information recorded for the other locations that match the same pattern. Where patterns are parameterized by values or types, the compiler uses a multilevel map of pattern id to parameter to parameter to a set of method and bytecode offset tuples representing matching locations.

As another example, for value profile information, a particular code segment may include the following sequence:
   Object obj=table.get(customerName);
   String s=obj.toString( );

The compiler searches, based on the syntax of the above code segment, for other code locations where this same code pattern is seen, a call to toString on an object of declared type java/lang/Object, and uses the consolidated value profile information to determine whether CustomerRecord.to-String should be inlined. If so, the compiler inlines the code with a profiled guard at code locations without any profile information.

In some semantic-matching embodiments, a compiler processing a particular code segment for optimization will statically construct a set of semantic patterns of interest (e.g., other locations in the program which could provide similar information from a different pattern) based on a sequence within the particular code segment. For example, a particular code segment may include the following bytecode sequence:
   aload_0
   instanceof #1 "CustomerName"
   ifeq In some cases, if the compiler attempts a syntactic match, it may not find any other locations in the program code where there is a syntactically matching code segment with profile information. Thus, as an alternative embodiment, the compiler searches for other code segments that can provide similar profile information that is associated with a code segment that has a different syntactic pattern. For example, the program code may include a code segment associated with profile information where the code segment is as follows:
   Object obj=table.get(customerName);
   String s=obj.toString( );

In some such embodiments, the compiler stores the method and bytecode offset for any such pattern match into a map data structure keyed on the pattern's unique identifier, where the map data structure holds tuples of methods and bytecode offsets that match respective keyed patterns. Following this example, in some embodiments, the compiler determines the probability of the receiver being of type CustomerName vs another type, and then uses the probability to estimate if a particular implementation should be inlined as the most probable call target for the toString invocation.

In some embodiments, the compiler searches for other code segments that can provide similar profile information that is associated with a code segment that has a different syntactic pattern using a rule for recognizing logically related conditions in the code. For example, a particular code segment may include the following sequence:
   boolean condition=getSomeCondition( );
   If (condition)
   {
   . . .

In some such embodiments, the compiler checks for profile information for the above code segment. If the compiler determines that there is no profile information for this code segment, the compiler next constructs a set of semantic patterns of interest (e.g., other locations in the program which could provide similar information from a different pattern) based on a sequence within this particular code segment. The compiler stores the method and bytecode offset for any such pattern match into a map data structure keyed on the pattern's unique identifier. For example, a pattern match may include the following sequence:
   boolean condition=getSomeCondition( );
   if (!condition)
   {
   . . .
   }

In some such embodiments, the compiler checks for profile information for the above code segment. If the compiler determines that the above code segment has profile information, then the compiler performs an optimization on the particular code segment being executed. For example, if the profile information indicates the branch bias, then the compiler may use this information to derive the branch bias of the particular code segment and optimize the particular code segment accordingly.

In some embodiments, the compiler searches for other code segments that can provide similar profile information that is associated with a code segment that has a different syntactic pattern using a rule for seeing through assignments that obfuscate the fact that two code patterns are in fact semantically similar. For example, a particular code segment may include the following sequence:

Object obj=table.get(customerName);
    String s=obj.toString( );

In some such embodiments, the compiler checks for profile information for the above code segment. If the compiler determines that there is no profile information for this code segment, the compiler next constructs a set of semantic patterns of interest based on the rule and a sequence within this particular code segment. For example, a pattern match may include the following sequence:

Object obj1=table.get(customerName);
    . . . other unrelated code . . .
    Object obj=obj1;
    String s=obj.toString( );

In some embodiments, the compiler checks for profile information for the above code segment. If the compiler determines that the above code segment has profile information, then the compiler performs an optimization on the particular code segment being executed. For example, if the profile information indicates the type of object, then the compiler may use this information to derive the type of object of the particular code segment and optimize the particular code segment by performing profile guarded inlining for the derived type of object.

In some such embodiments, the compiler uses any of a variety of pattern recognition techniques to find semantically similar code, for example reaching definitions, abstract interpretation, or value propagation. Such semantic-matching embodiments allows for matching of code segments more completely than syntactic matching by searching based on the code segment's semantics with less concern for the actual structure of the code.

In some context-matching embodiments, a compiler processing a particular code segment for optimization will identify candidate code segments, for example according to a syntactic-matching or semantic-matching embodiment. When the compiler performs a syntactic or semantic search, the compiler is searching for other operations that seem to be doing the same thing as the particular code segment undergoing optimization processing. For example, the compiler may be searching for the "draw" method of the abstract Shape class to determine the probability of Shape being a Square. have many different contextually related and unrelated places that test Shape for Square or that give you a probability of Shape being a Square. For example, the application may place in the application code that call "draw" for Square as part of larger code segments that draw different compound shapes. Such places that test Shape for Square include the type of information the compiler is seeking. However, some of those places will be for the same compound shape as the particular code undergoing optimization processing, and will therefore be contextually similar, while other places will be for other compound shapes and will therefore be contextually dissimilar. This situation can lead to uncertain results because the type testing probabilities may be very different depending on which compound shape is drawn. Thus, if the compiler is simply aggregating syntactically or semantically similar code, the results may be too uncertain to be useful as a substitute for profile data.

Therefore, context-matching embodiments identify candidate code segments, for example according to a syntactic-matching or semantic-matching embodiment, and then perform a context sensitive analysis of each of the candidate code segments by evaluating their surrounding code segments. In such embodiments, the compiler further searches for a particular important operation before a candidate code segment and/or a particular important operation after a candidate code segment. In some embodiments, the length of the operations is set or restricted according to a tunable parameter. The longer the length of operations being searched, the more expensive in terms of processing it is to conduct the search for a match and the less likely it is that the compiler will find a match, but the more likely it is that any search results found will yield reliable information.

In some context-matching embodiments, the compiler generates a match pattern that includes syntactic or semantic search criteria for a particular code segment undergoing optimization processing, and criteria related to trace information, which includes some length of operations that are prefix and/or suffix operations to the particular code segment. The compiler performs the syntactic or semantic search to identify candidate code segments that match the search criteria and have profiling information. For each candidate code segment, the compiler generates a trace for each candidate code segment that includes instruction sequences before and/or after the candidate code segment. Once the compiler has generated a trace for each candidate code segment, the compiler examines each trace to identify other patterns that match the trace criteria, resulting in a trace of recognized and profiled patterns for each candidate code segment.

In some context-matching embodiments, once the compiler has generated traces of recognized and profiled patterns the candidate code segments, the compiler inserts these traces into a data structure of candidate code segments. In some embodiments, an arrangement of the data structure is based at least in part on respective degrees of similarity between the particular code segment and each of the candidate code segments. For example, in some embodiments, the compiler inserts these traces into a suffix tree data structure to allow for fast searching and fuzzy matching. The compiler then begins at a point with no profiling information, pattern matches particular code segment, generates a trace from prefix and suffix operations of the particular code segment, and maps the trace into a pattern trace. The compiler takes this pattern trace and uses known suffix tree matching algorithms to match the pattern trace to one or more existing traces that have profile data. The compiler then uses the profiling data of the matched traces to derive substitute profiling information for particular code segment undergoing optimization processing. the unknown point. For example, a particular code segment may include the following sequence, which includes a method that has profile data and a method that has no profile data:

void wellProfiled(Object arg1, Object arg2)}
      if (arg1 instanceof CustomerRecord)
        if (arg2 instanceof CustomerRecord)
        . . . arg1.toString( ); . . .
        arg2.toString( );
        . . .
      }
    . . .
    }
    if (arg1.equals(arg2)) {

```
    . . .
} else {
    . . .
}
}
```

In this example, the call to arg2.toString( ) has no profile information to tell the compiler which implementation of toString is most likely to be called. In some context-matching embodiments, the compiler selects a trace, for example a trace that includes all the statements shown in the sample code above. In this example, the compiler has patterns to match instanceof operations and virtual calls. The compiler takes the trace statements and reduces the statement trace to the following pattern trace:

Instanceof(Object, CustomerRecord)→instanceof(Object, CustomerRecord)→virtual_call(CustomerRecord, toString)→virtual_call(CustomerRecord, toString)→equals(Object, Object)

The compiler uses this pattern trace to match search for traces that have profile data and attempt to find the closest match with profile data for the second virtual call in the match sequence. The compiler can then use matching traces to provide receiver profile information to be aggregated and used to predict the likely dispatch target for the toString call.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
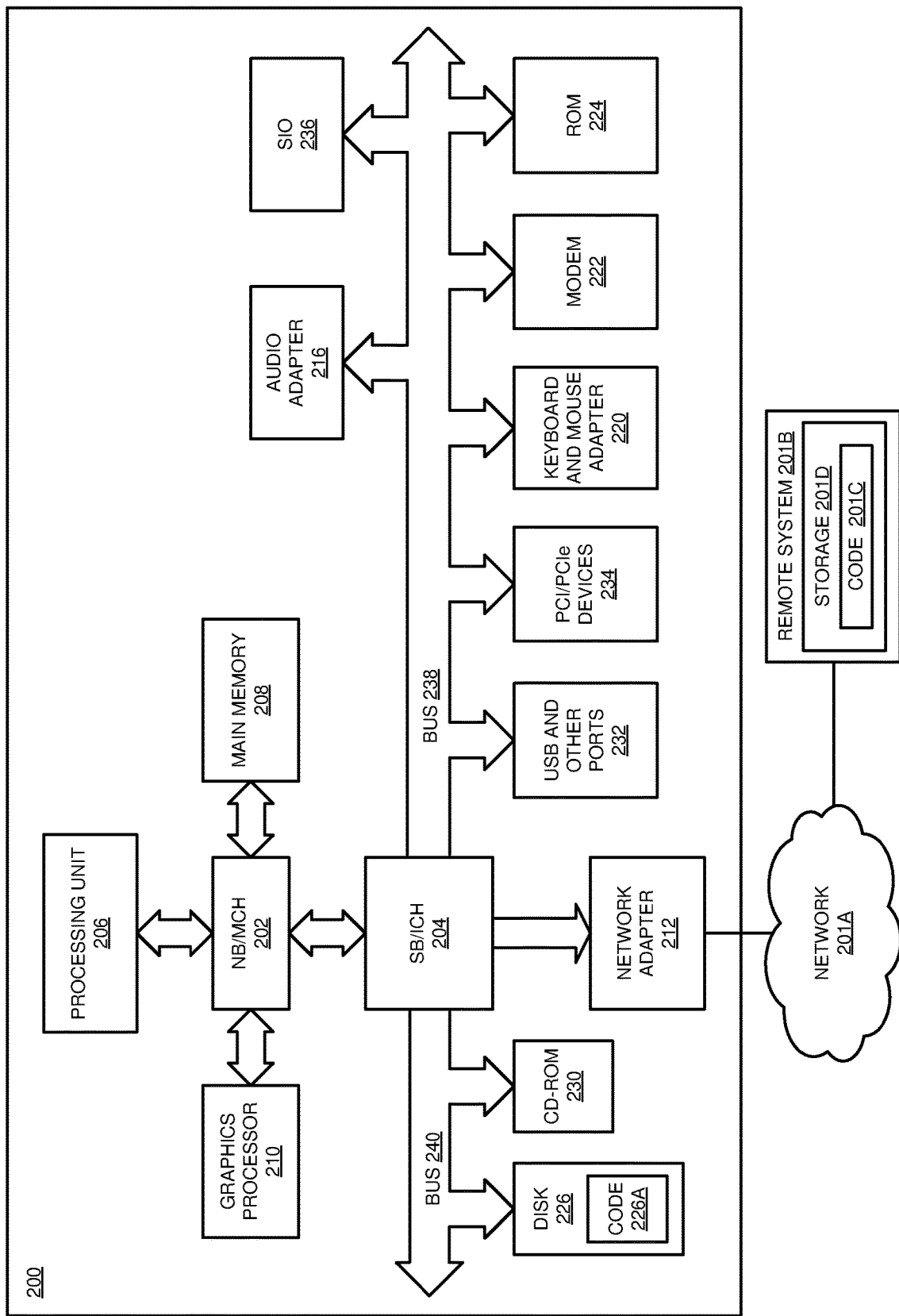
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by neural network application 105B such as initiating processes described herein of the neural network. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
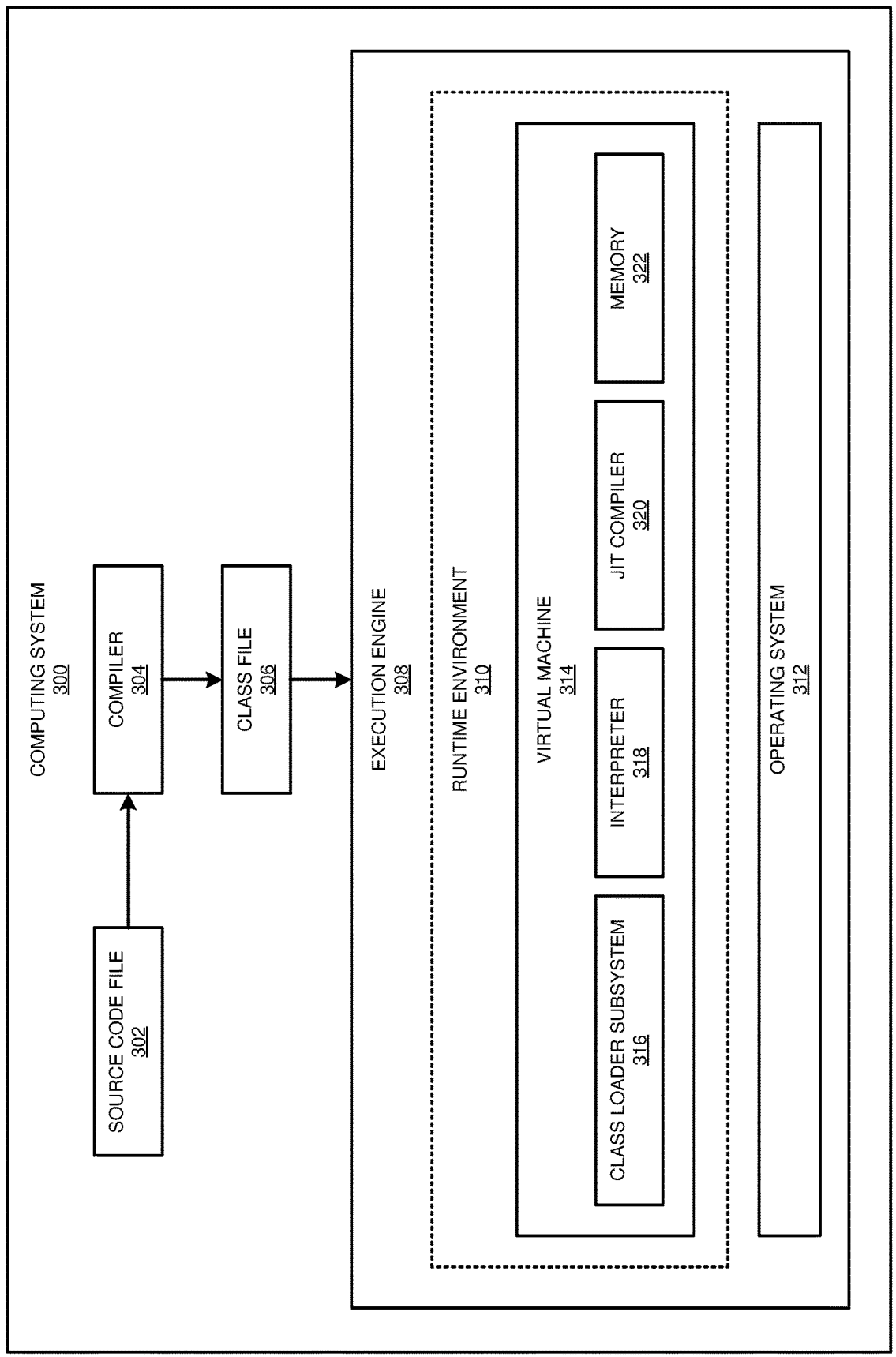
FIG. 3 depicts a block diagram of an example computing system in accordance with an illustrative embodiment.

With reference to FIG. 3, this figure depicts a block diagram of an example computing system 300 in accordance with an illustrative embodiment. This figure depicts an embodiment of a computing system 300 that includes a virtual machine 314, such as a JVM. In some embodiments, the virtual machine 314 performs processes according to the flowcharts shown in FIG. 9 or 10. In some embodiments, the virtual machine 314 is an example of application 105A/105B of FIG. 1.

In some embodiments, the computing system 300 also includes a compiler 304 and an operating system 312. The operating system 312 runs on computer hardware and provides an operating environment for applications run by the virtual machine 314. The virtual machine 314 includes a class loader subsystem 316, an interpreter 318, a JIT compiler 320, and memory 322. Embodiments of the memory 322 may include any form of electronic or computer usable storage device. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the computing system 300 includes source code 302 that contains code that has been written in a particular programming language, such as Java, C, C++, C#, Ruby, or Perl. Thus, the source code 302 adheres to a particular set of syntactic and/or semantic rules for the associated language. For example, code written in Java adheres to the Java Language Specification. However, since specifications are updated and revised over time, the source code 302 may be associated with a version number indicating the revision of the specification to which the source code 302 adheres.

In some embodiments, the compiler 304 transforms the source code 302 into class files 306, for example in the form of bytecode, representing a program to be executed. For example, in some embodiments, the source code 302 comprises one or more files that are inputted to the compiler 304. The compiler 304 processes the one or more files and outputs the resulting bytecode as one or more class files 306.

In some embodiments, the class files 306 are then loaded and executed by an execution engine 308, which includes a runtime environment 310, and an operating system 312. The runtime environment 310 includes a virtual machine 314 that receives the class files 306 and inputs the bytecode of the class files 306 into the interpreter 318 or JIT compiler 320. The interpreter 318 and JIT compiler 320 generate machine code, which the virtual machine 314 outputs to the operating system 312 for running the program. In some embodiments, the virtual machine 314 processes the bytecode of a program while the program is executing. As a result, the processing time of the virtual machine 314 affects the runtime performance of the program. In some embodiments, the JIT compiler 320 uses optimization techniques described herein to reduce the processing time of the virtual machine 314 and thereby improve the runtime performance of the program.

In some embodiments, the virtual machine 314 uses the interpreter 318 and JIT compiler 320 to execute a program using a combination of interpretation and compilation techniques. In some such embodiments, the virtual machine 314 initially begins by interpreting the bytecode representing the program using the interpreter 318 while collecting profile data related to program behavior. For example, some embodiments collect profile data representative of how often different sections or blocks of code are executed by the virtual machine 314. In some embodiments, when an interpreted method call is executed, the virtual machine 314 increments an "invocation counter," which is metadata stored in a profile structure associated with the called method. When the invocation counter exceeds a compilation threshold, the virtual machine 314 generates a compilation thread (or uses an existing compilation thread) to compile/optimize the method. In alternative embodiments, the virtual machine 314 keep tracks of the number of times a loop is iterated through in a method using a "backedge counter," and the compilation is triggered when the backedge counter reaches a compilation threshold.

In some embodiments, once a block of code surpasses a specified threshold (is "hot"), the virtual machine 314 invokes the JIT compiler 320 to use an optimization technique to reduce an amount of processing time used by the virtual machine 314 to process the block of code into machine-level instructions. However, some such embodiments include unoptimized periods of program execution during which the virtual machine 314 processes blocks of code (e.g., by executing the code in interpreted mode) until JIT compilation prior to identifying the blocks as a hot blocks of code.

In some embodiments, the virtual machine 314 implements techniques described herein to perform compiler optimizations during program execution, including during periods of program execution when little or no profile data is available for one or more code segments or blocks of code. Such periods of program execution are not limited to early or initial periods of program execution, but can occur throughout the execution of a program. For example, Java technology-based programs can change on the fly at any point during program execution due to a powerful ability to perform dynamic loading of classes. This dynamic loading of a class invalidates compiler optimizations and profile data collected by the virtual machine 314 prior to the class change. When compiler optimizations and profile data become invalid due to dynamic loading, this creates a period of program execution that can occur at any point during program execution during which little or no profile data is available for code segments associated with the dynamically loaded class. In some embodiments, the virtual machine 314 uses techniques described herein that allow for compiler optimization of a code segment during any such periods of program execution. Such embodiments have the potential to improve program performance throughout the execution of the program compared to embodiments that lack optimization during such periods.

While the illustrated embodiment shows the memory 322 as part of the virtual machine 314, alternative embodiments locate the memory 322 elsewhere outside of the virtual machine 314 but in communication with the virtual machine 314. Embodiments of the memory 322 include memory on a single electronic or computer usable storage device or memory distributed among any number of electronic or computer usable storage devices.

Figure 4:
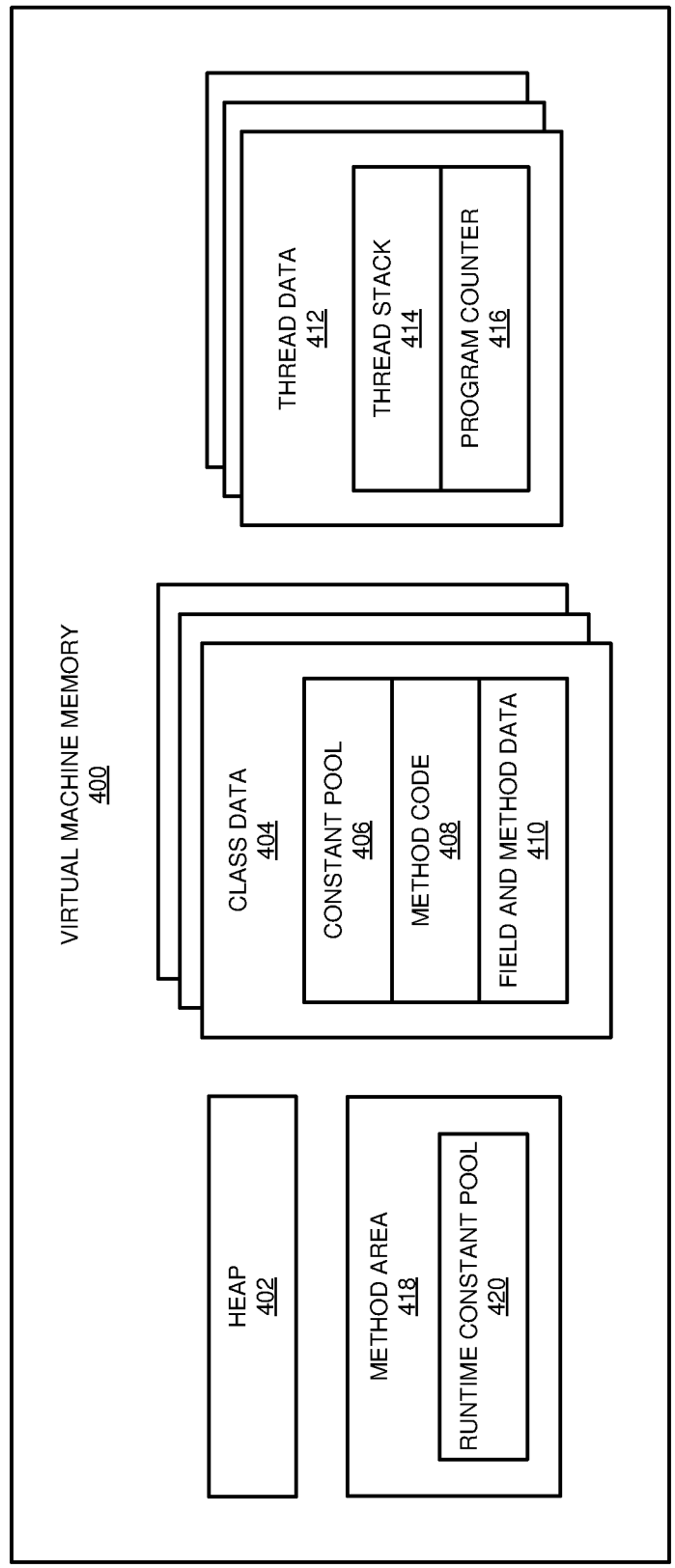
FIG. 4 depicts a flowchart of an example layout of virtual machine memory in accordance with an illustrative embodiment.

With reference to FIG. 4, this figure depicts a block diagram of an example layout of virtual machine memory 400 in accordance with an illustrative embodiment. Although components of the virtual machine memory 400 may be illustrated or referred to as memory areas, blocks or otherwise, there is no requirement that the memory areas are contiguous. In some embodiments, the virtual machine memory 400 is an example of memory 322 of FIG. 3.

In the illustrated embodiment, the virtual machine memory 400 includes a heap 402, a class data area 404, a thread data area 412, and a method area 418. In an embodiment, the heap 402 represents the run-time data area from which memory for class instances and arrays is allocated. In an embodiment, the class data area 404 represents the memory area where data pertaining to each of the individual classes is stored. In an embodiment, the class data area 404 includes, for each loaded class, a runtime constant pool 406 representing data from a constant table of each class, method code 408 representing the virtual machine instructions for methods of the class, and field and method data 410 representing data such as the static field data of each class. The method area 418 includes class data, including a runtime constant pool 420, that is shared across all threads running in the virtual machine.

In the illustrated embodiment, the thread data area 412 represents a memory area where structures specific to each of the individual threads is stored. The thread area 412 includes, for each thread executing on a virtual machine (e.g., virtual machine 314 of FIG. 3), a thread stack 414 and a program counter 416. In an embodiment, program counter 416 stores the current address of the virtual machine instruction being executed for each respective thread. Thus, as a thread steps through the instructions, the program counters are updated to maintain an index to the current instruction. In an embodiment, thread stack 414 stores frames for their respective threads that hold local variables and partial results, and is also used for method invocation.

Figure 5:
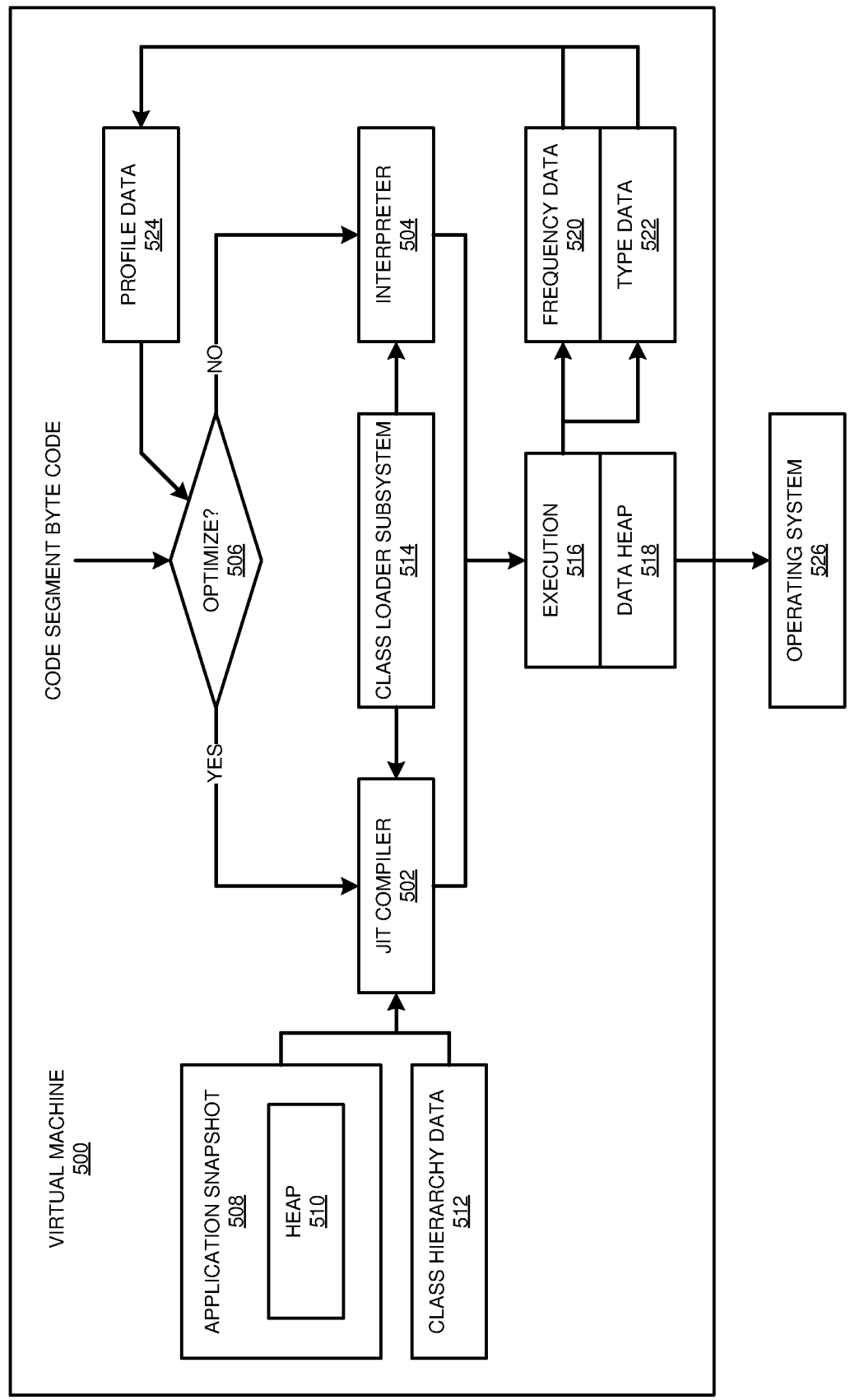
FIG. 5 depicts a block diagram of example virtual machine in accordance with an illustrative embodiment.

With reference to FIG. 5, this figure depicts a block diagram of an example virtual machine 500 in accordance with an illustrative embodiment. In some embodiments, the virtual machine 500 is an example of virtual machine 314 of FIG. 3.

In the illustrated embodiment, the virtual machine 500 includes a JIT compiler 502 and an interpreter 504. Although the illustrated embodiment depicts the JIT compiler 502 and the interpreter 504 as separate components, in alternative embodiments the JIT compiler 502 and interpreter 504 may be integrated into a single component. In some embodiments, the virtual machine 500 includes a decision mechanism 506 that controls whether byte code will be compiled by the JIT compiler 502 or interpreted by the interpreter 504. In some embodiments, the decision mechanism 506 selects the JIT compiler 502 based on the availability of profile data 524 for the invoked segment. However, embodiments disclosed herein allow for profile information to be derived for code segments that lack profile data. Such embodiments allow the decision mechanism to select the JIT compiler 502 even in situations where profile data 524 is not available or sufficient for the given invoked code segment. For example, in some embodiments, the decision mechanism 506 selects the JIT compiler 502 based on the type of code in the invoked code segment regardless of the availability of profile data memory 524.

In the illustrated embodiment, the virtual machine 500 includes a class loader subsystem 514 that provides a mechanism for loading types, which are classes and interfaces, and makes them accessible for the JIT compiler 502 and interpreter 504. In the illustrated embodiment, the virtual machine 500 also includes a frequency data component 520 and a type data component 522, which are examples of profiling instrumentation that obtain information for building profile data in a profile data memory 524. The type data component 522 collects type information about each variable in the program, and records the type information in profile data memory 524. The frequency data component 520 collects frequency information that indicates how many times each function is executed and records the information in profile data memory 524.

In some embodiments, JIT compiler 502 performs a second level of compiling to create code (e.g., JIT code) that is output as optimized code and executed by the execution component 516, which updates the data heap 518 and executes the application on an operating system 526. In some embodiments, the JIT compiler 502 optimizes code segments using profile data from the profile data memory 524. In some embodiments, if there is no profile data for a given code segment, the JIT compiler 502 will instead attempt to optimize the code segment using alternative data, such as class hierarchy data 512 or data from an application heap 510 at a point where an application snapshot 508 is taken (e.g., where the snapshot is a preserved a state of an application).

In some embodiments, there are fail-safe paths that couple the execution component 516 to each of the JIT compiler 502 and the interpreter 504. These fail safe paths transfer control from the execution component 516 to the interpreter 504 when certain assumptions in the optimized code (e.g., optimized JIT code) become invalid during runtime and execution needs to fall to the interpreter, which does not make such assumptions.

Figure 6:
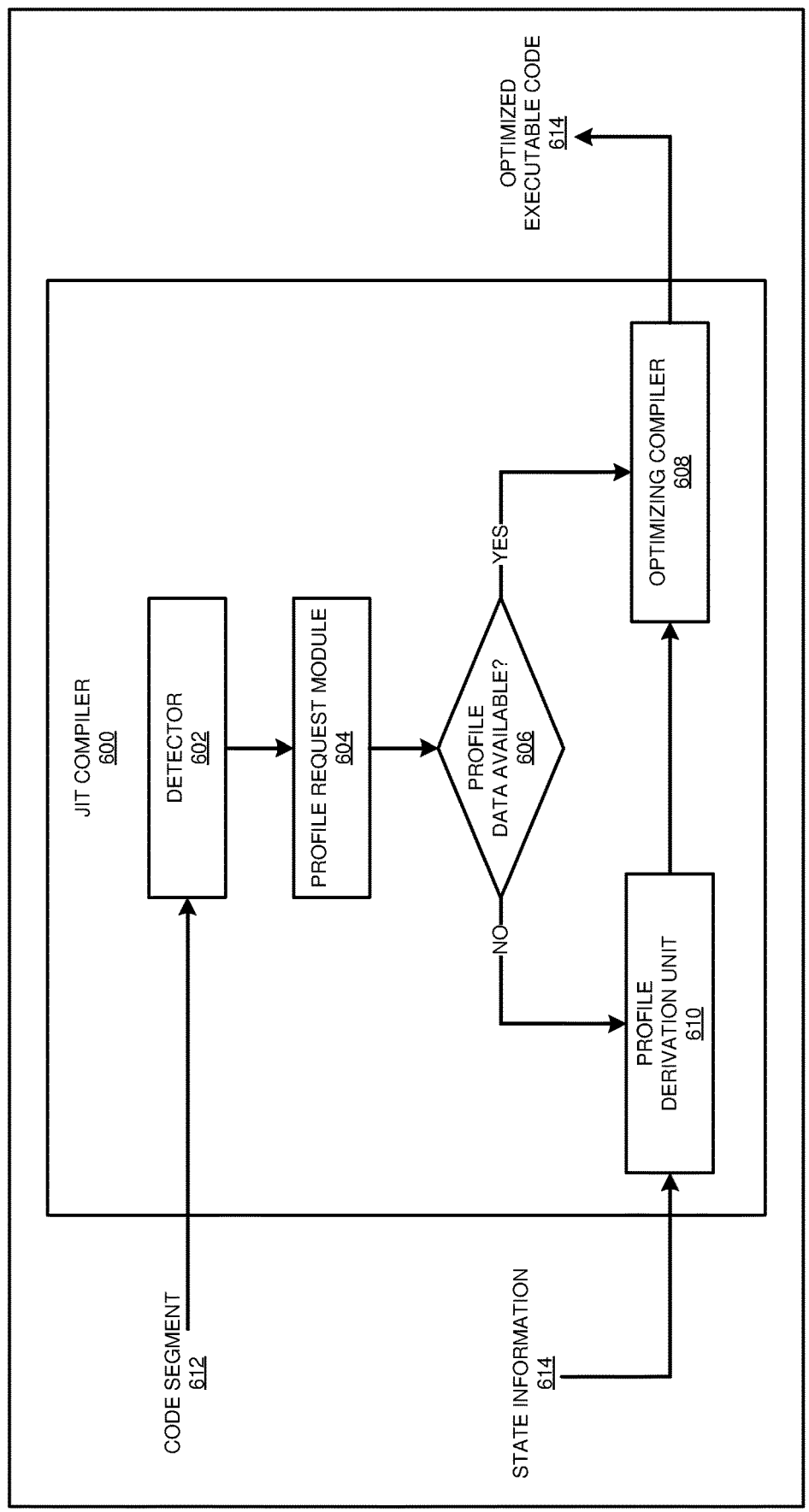
FIG. 6 depicts a flowchart of an example JIT compiler in accordance with an illustrative embodiment.

With reference to FIG. 6, this figure depicts a block diagram of an example JIT compiler 600 in accordance with an illustrative embodiment. Although the illustrated embodiment shows a JIT compiler 600, alternative embodiments include other types of optimizing compilers. In some embodiments, the JIT compiler 600 is an example of JIT compiler 502 of FIG. 5.

In some embodiments, JIT compiler 600 includes a detector 602 that receives a code segment 612, for example in byte code, and detects or derives information about the code segment, such as the type of instruction that the byte code represents. For example, the byte code may involve a call to a method that is potentially polymorphic, such as a call to a virtual method, or other type of code that has the potential to be optimized by the JIT compiler 600. In the illustrated embodiment, the detector 602 sends information about the code segment 612 detected by detector 602 to a profile request module 604. The profile request module 604 receives the information about the code segment 612, which triggers the profile request module 604 to request profile data the for the code segment 612. For example, in some embodiments, the profile request module 604 requests the profile information by sending a request for profile information associated with a specific method and bytecode offset associated with the code segment 612. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the JIT compiler 600 includes a decision module 606 that determines if profile request module 604 received any profile information in response to the request. If so, the profile data is provided to an optimizing compiler 608. Otherwise, a profile derivation unit 610 is triggered by the lack of profile data to generate data that can be used for optimization as an alternative in the absence of profile data. For example, in some embodiments, the profile derivation unit 610 receives the information detected by detector 602 about the code segment 612 and associated state information 614 as a basis for generating alternative profile data. In some embodiments, the profile derivation unit 610 receives the information detected by detector 602 directly from the detector 602, whereas in alternative embodiments, the profile derivation unit 610 receives the information detected by detector 602 forwarded from the profile request module 604. The profile alternative data is then provided to the optimizing compiler 608. The optimizing compiler 608 receives either profile data or the profile alternative data and uses whichever it receives to create optimized executable code, which optimizing compiler 608 outputs to an execution component (e.g., execution component 516 of FIG. 5) for execution on an operating system (e.g., operating system 526 of FIG. 5).

Figure 7:
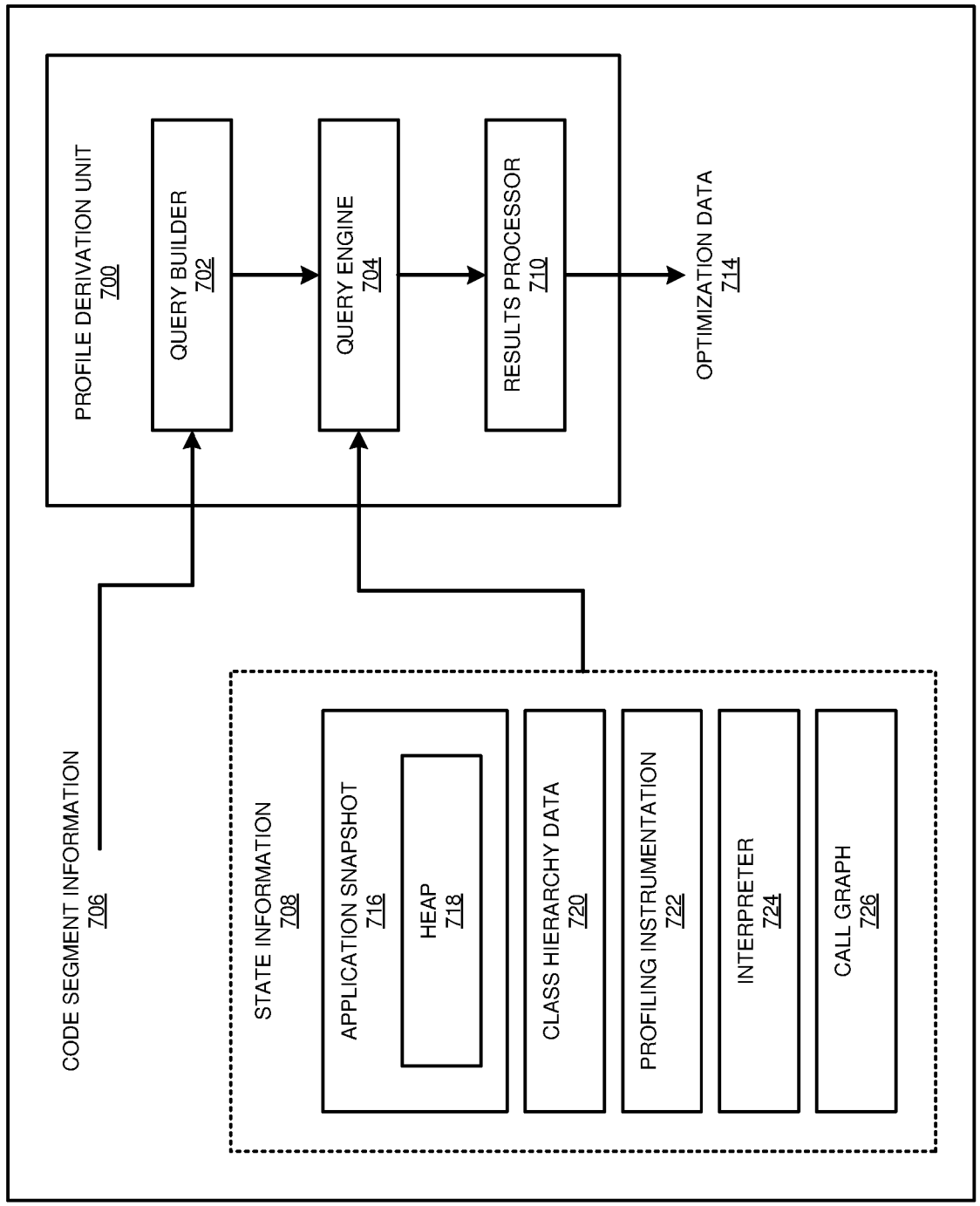
FIG. 7 depicts a flowchart of an example profile derivation unit in accordance with an illustrative embodiment.

With reference to FIG. 7, this figure depicts a block diagram of an example profile derivation unit 700 in accordance with an illustrative embodiment. In some embodiments, the profile derivation unit 700 is an example of profile derivation unit 610 of FIG. 6.

In the illustrated embodiment, the profile derivation unit 700 receives code segment information 706 associated with a code segment being compiled. For example, in an embodiment, the code segment information 706 is an example of information detected by detector 602 that the profile derivation unit 610 receives from the detector 602 about code segment 612 in FIG. 6.

In the illustrated embodiment, the profile derivation unit 700 uses the state information 708 to optimize a code segment in the absence of profile information for the code segment. For example, in some such embodiments, the compiler uses class hierarchy data (e.g., class hierarchy data 512 of FIG. 5) to optimize a code segment.

In the illustrated embodiment, the profile derivation unit 700 includes a query builder 702, a query engine 704, and a results processor 710. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the query builder 702 evaluates the code segment information 706 to generate criteria for searching state information 708. For example, in some embodiments, the query builder 702 generates a criterion or criteria for searching data representative of a current state of the class hierarchy table. The query engine 704 receives the criterion or criteria from the query builder 702 and initiates a search of one or more data sources. The results processor 710 receives the results of the query or queries initiated by the query engine 704 and filters the results for data that can be used for an optimization process. The results processor 710 provides the filtered results as optimization data 714 to an optimizing compiler, such as optimizing compiler 608 of FIG. 6. In some embodiments, the results processor 710 produces optimization data 714 that is in the same format as profile data output by the profile request module 604 in FIG. 6.

As an example, in an embodiment, the query builder 702 identifies that the code segment information 706 involves a call to a method that is potentially polymorphic, such as a call to a virtual method, and therefore generates a query of state information 708 to determine if one particular derived class is usually loaded so that the code segment can be optimized accordingly. In some such embodiments, the query builder 702 generates, as a criterion for the query, any derived class that has already been loaded. In alternative embodiments, the query builder 702 also generates, as another criterion for the query, any derived class that has already been instantiated. In some embodiments, the query engine 704 receives the criterion or criteria from the query builder 702 (search for derived classes that have been loaded) and initiates a search of state information 708, such as class hierarchy data. The results processor 710 receives the results of the query or queries initiated by the query engine 704, which in this example may include a list of classes that have loaded, and alternatively may also include a list of classes that have been instantiated. The results processor 710 filters these results for data that can be used for an optimization process, for example by determining that there is one particular derived class that is always or most frequently called from among the loaded and/or instantiated classes. The results processor 710 provides the filtered results as optimization data 714 to an optimizing compiler, such as optimizing compiler 608 of FIG. 6, which in this example may inline the commonly called derived class and inject "guard code" that includes a type test to confirm that the object is the derived class. In some embodiments, the results processor 710 produces optimization data 714 that is in the same format as profile data output by the profile request module 604 in FIG. 6.

In some such embodiments, the instantiation of the derived classes is tracked by profiling instrumentation 722, such as frequency data component 520 of FIG. 5, at the point of object instantiation. In alternative embodiments, the instantiation of the derived classes is tracked by processing the application heap 718 at the point where a snapshot 716 is being taken. In other alternative embodiments, the instantiation of the derived classes is tracked by combining data regarding which classes were instantiated by which methods (e.g., as tracked in an interpreter 724) and data from a call graph 726 or other class hierarchy data 720 built up to capture the flow of control from a snapshot 716. In such embodiments, the compiler combines the dynamic execution state (e.g., data regarding which classes were instantiated by which methods) with a static analysis (e.g., data from the snapshot point, such as data from the call graph 726) to produce a substitute for a lack of profiling information at some code location. Having the call graph 726 and doing essentially a reachability analysis with the instantiated classes starting at the code locations where the classes were instantiated reveals which methods an instance of a given class can reach. This context sensitive approach towards using the program state at a snapshot point advantageously filters out instantiated classes that cannot reach a particular program point based on the reachability analysis.

Figure 8:
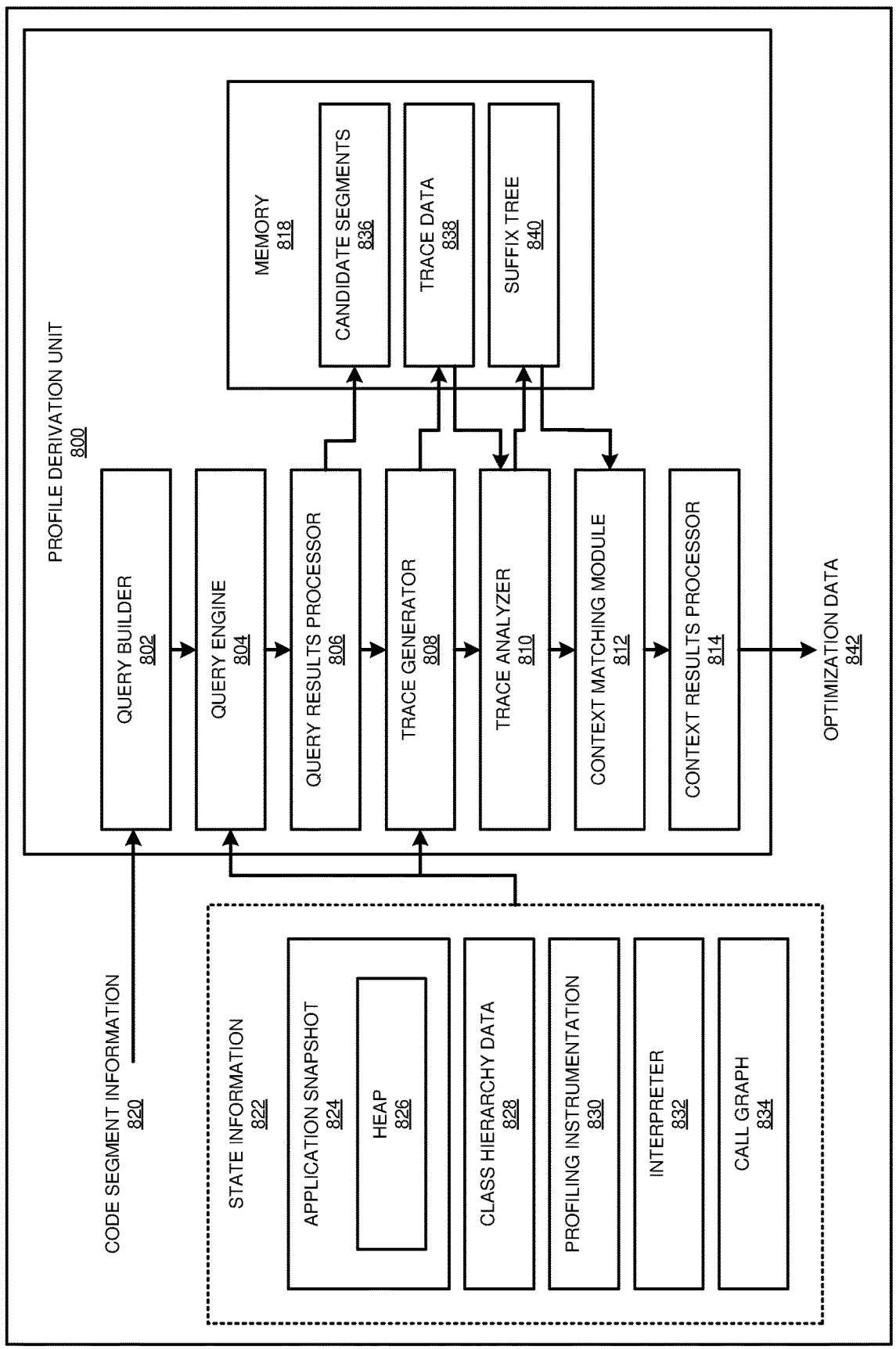
FIG. 8 depicts a block diagram of an alternative example profile derivation unit example virtual machine in accordance with an illustrative embodiment.

With reference to FIG. 8, this figure depicts a block diagram of an alternative example profile derivation unit 800 in accordance with an illustrative embodiment. In some embodiments, the profile derivation unit 800 is an example of profile derivation unit 610 of FIG. 6.

In the illustrated embodiment, the profile derivation unit 800 receives code segment information 820 associated with a code segment being compiled. For example, in an embodiment, the code segment information 820 is an example of information detected by detector 602 that the profile derivation unit 610 receives from the detector 602 about code segment 612 in FIG. 6.

In the illustrated embodiment, the profile derivation unit 800 uses the state information 822 to optimize a code segment in the absence of profile information for the code segment. For example, in some such embodiments, the compiler uses class hierarchy data (e.g., class hierarchy data 512 of FIG. 5) to optimize a code segment.

In the illustrated embodiment, the profile derivation unit 800 includes a query builder 802, a query engine 804, a query results processor 806, a trace generator 808, a trace analyzer 810, a context matching module 812, a context results processor 814, and memory 818. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the query builder 802 evaluates the code segment information 820 to generate criteria for searching state information 822. For example, in some embodiments, the query builder 802 generates a criterion or criteria for searching data representative of a current state of the class hierarchy table. The query engine 804 receives the criterion or criteria from the query builder 802 and initiates a search of state information 822 and/or one or more other data sources. The query results processor 806 receives the results of the query or queries initiated by the query engine 804 and stores the resulting code segments as candidate code segments 836 in memory 818. The query results processor 806 also provides the state information 822 a trace generator 808.

The trace generator 808 retrieves a statement trace that includes context code segments from application code that precedes and succeeds the invoked code segment. The trace generator 808 then stores the statement trace as trace data 838 in memory 818. In some embodiments, the trace generator 808 then retrieves respective result-context traces for each of the candidate code segments 836 from the query results, where the result-context traces include result-context code segments from application code that precede and succeed the result code segments. In some embodiments, the trace analyzer 810 reduces the context code segments to an invoked pattern trace. In some embodiments, the trace analyzer 810 then generates a suffix tree data structure from the candidate code segments 836 and their respective pattern traces. The trace analyzer 810 then stores the suffix tree data structure as suffix tree data 840 in memory 818. The context matching module 812 maps the invoked pattern trace to the suffix tree to identify the closest matching result and result-context code segments that have correlative profile data. the context matching module 812 provides the closest matching result and result-context code segments to the context results processor 814. The context results processor 814 generates an extrapolated profile dataset based on the data from the closest matching results found by the context matching module 812. The context results processor 814 provides the extrapolated profile dataset to an optimizing compiler, such as optimizing compiler 608 of FIG. 6, which in this example may inline the commonly called derived class and inject "guard code" that includes a type test to confirm that the object is the derived class. In some embodiments, the context results processor 814 produces optimization data 842 that is in the same format as profile data output by the profile request module 604 in FIG. 6.

In some such embodiments, the instantiation of the derived classes is tracked by profiling instrumentation 830, such as frequency data component 520 of FIG. 5, at the point of object instantiation. In alternative embodiments, the instantiation of the derived classes is tracked by processing the application heap 826 at the point where a snapshot 824 is being taken. In other alternative embodiments, the instantiation of the derived classes is tracked by combining data regarding which classes were instantiated by which methods (e.g., as tracked in an interpreter 832) and data from a call graph 834 or other class hierarchy data 828 built up to capture the flow of control from a snapshot 824. In such embodiments, the compiler combines the dynamic execution state (e.g., data regarding which classes were instantiated by which methods) with a static analysis (e.g., data from the snapshot point, such as data from the call graph 834) to produce a substitute for a lack of profiling information at some code location. Having the call graph 834 and doing essentially a reachability analysis with the instantiated classes starting at the code locations where the classes were instantiated reveals which methods an instance of a given class can reach. This context sensitive approach towards using the program state at a snapshot point advantageously filters out instantiated classes that cannot reach a particular program point based on the reachability analysis.

Figure 9:
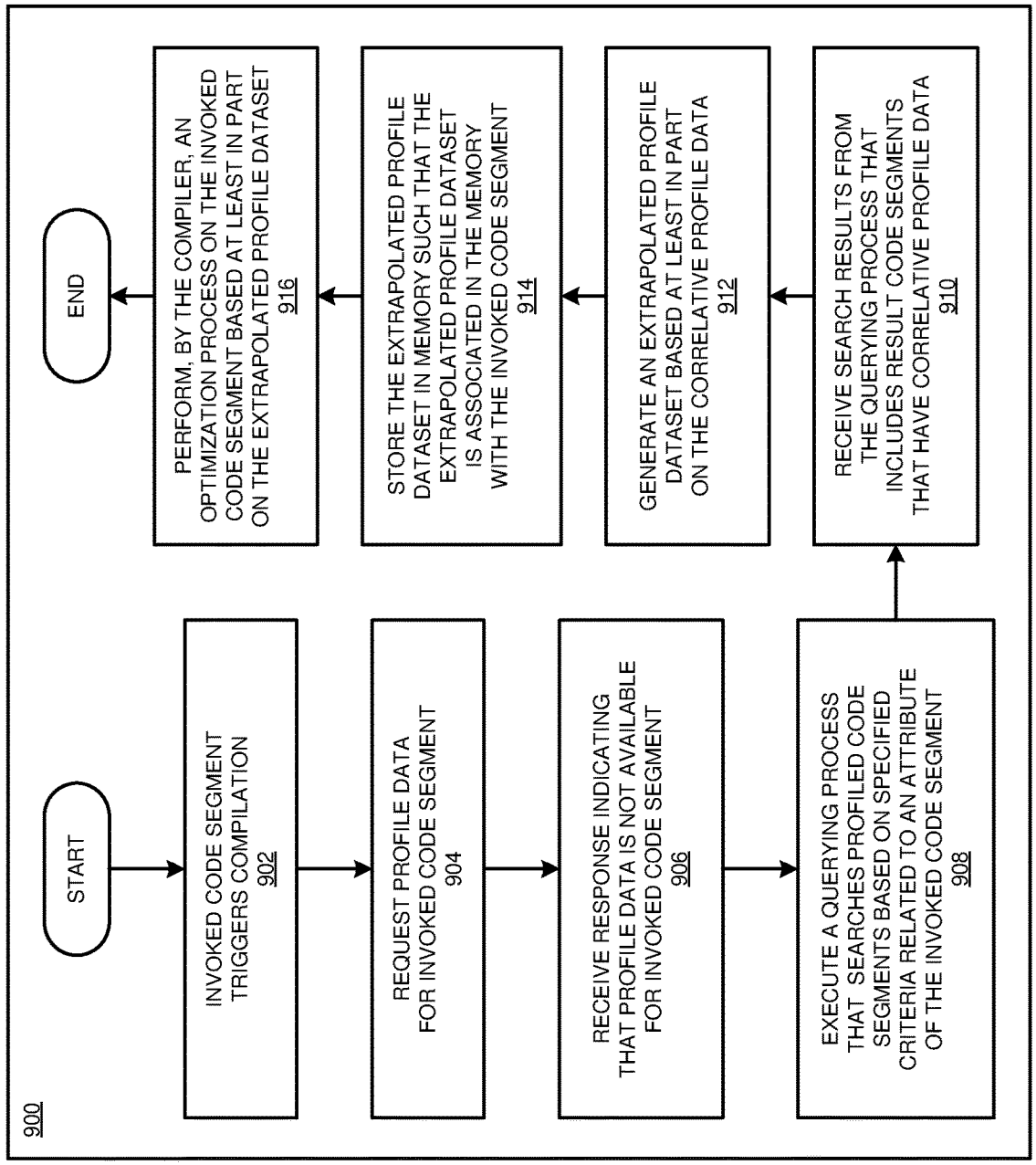
FIG. 9 depicts a flowchart of an example process for generating profile data in accordance with an illustrative embodiment.

With reference to FIG. 9, this figure depicts a flowchart of an example process 900 for generating profile data in accordance with an illustrative embodiment. In a particular embodiment, a compiler, such as the JIT compiler 502, carries out the process 900.

In an embodiment, at block 902, a compiler receives an invoked code segment that triggers compilation. Next, at block 904, the compiler requests profile data for the invoked code segment. Next, at block 906, the compiler receive a response indicating that profile data is not available for invoked code segment. Next, at block 908, the compiler executes a querying process that searches profiled code segments based on specified criteria related to an attribute of the invoked code segment. Next, at block 910, the compiler receives search results from the querying process that includes result code segments. Next, at block 912, the compiler generates an extrapolated profile dataset based on the correlative profile data. Next, at block 914, the compiler stores the extrapolated profile dataset in memory such that the extrapolated profile dataset is associated in the memory with the invoked code segment. Next, at block 916, the compiler performs an optimization process on the invoked code segment based on the extrapolated profile dataset.

Figure 10:
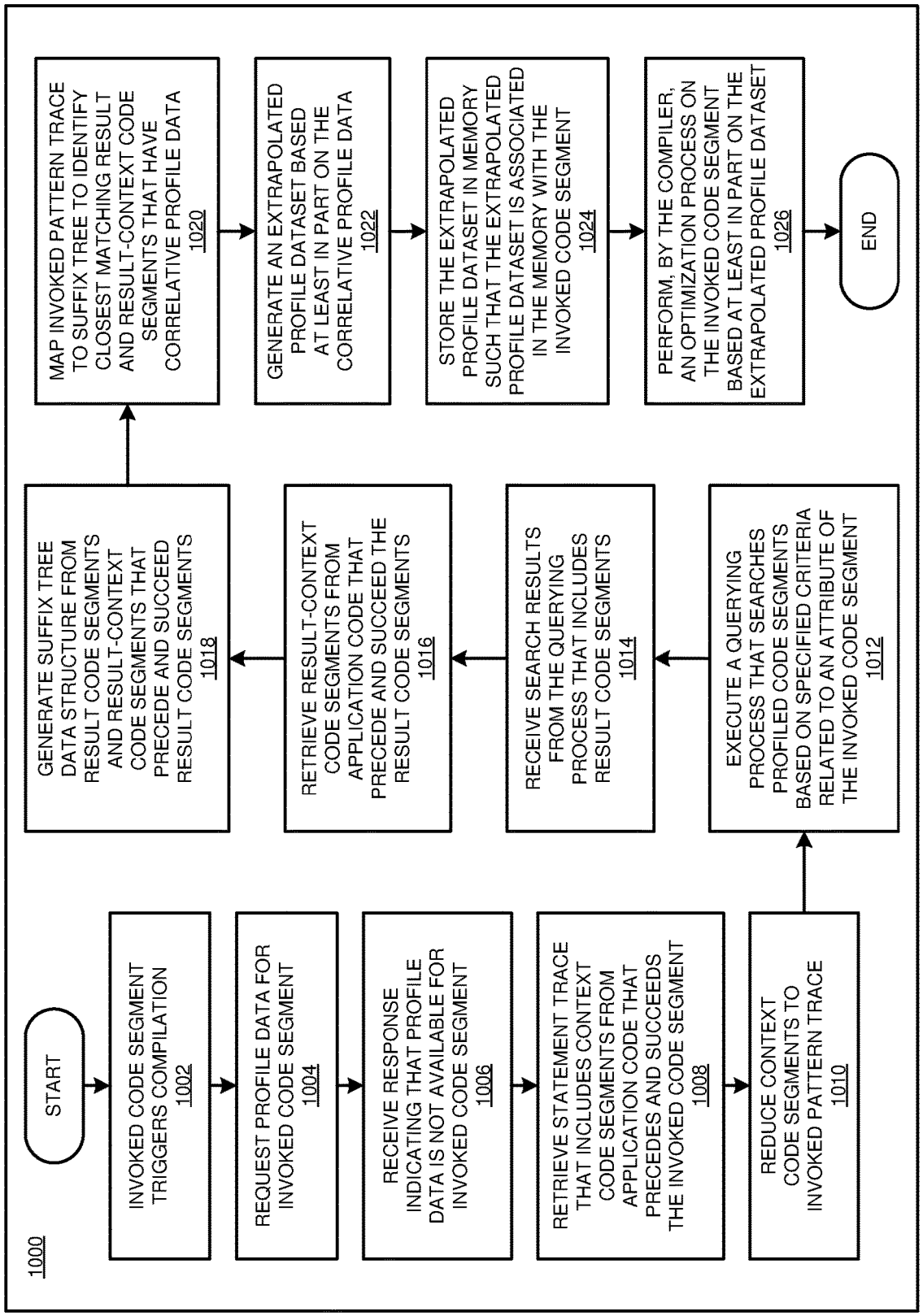
FIG. 10 depicts a flowchart of an alternative example process for generating profile data in accordance with an illustrative embodiment.

With reference to FIG. 10, this figure depicts a flowchart of an example process 1000 for generating profile data in accordance with an illustrative embodiment. In a particular embodiment, a compiler, such as the JIT compiler 502, carries out the process 1000.

In an embodiment, at block 1002, a compiler receives an invoked code segment that triggers compilation. Next, at block 1004, the compiler requests profile data for the invoked code segment. Next, at block 1006, the compiler receives a response indicating that profile data is not available for invoked code segment. Next, at block 1008, the compiler retrieves a statement trace that includes context code segments from application code that precedes and succeeds the invoked code segment. Next, at block 1010, the compiler reduces context code segments to invoked pattern trace. Next, at block 1012, the compiler execute a querying process that searches profiled code segments based on specified criteria related to an attribute of the invoked code segment. Next, at block 1014, the compiler receives search results from the querying process that includes result code segments. Next, at block 1016, the compiler retrieves result-context code segments from application code that precede and succeed the result code segments. Next, at block 1018, the compiler generates a suffix tree data structure from candidate code segments 836 and result-context code segments that precede and succeed result code segments. Next, at block 1020, the compiler maps the invoked pattern trace to the suffix tree to identify the closest matching result and result-context code segments that have correlative profile data. Next, at block 1022, the compiler generates an extrapolated profile dataset based on the correlative profile data. Next, at block 1024, the compiler stores the extrapolated profile dataset in memory such that the extrapolated profile dataset is associated in the memory with the invoked code segment. Next, at block 1026, the compiler performs an optimization process on the invoked code segment based on the extrapolated profile dataset.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
   requesting, by a compiler responsive to execution of a first code segment, a first profile dataset associated with the first code segment;
   executing, responsive to receiving an indication that the first profile dataset is not available, a querying process that searches other code segments based on specified criteria relating to an attribute of the first code segment;
   receiving a search result from the querying process, wherein the search result includes a second code segment;
   generating an extrapolated profile dataset based at least in part on the second code segment;
   storing the extrapolated profile dataset in memory such that the extrapolated profile dataset is associated in the memory with the first code segment; and
   performing, by the compiler, an optimization process on the first code segment based at least in part on the extrapolated profile dataset.

2. The computer-implemented method of claim 1, wherein the querying process searches only aggregate program state information.

3. The computer-implemented method of claim 2, wherein the program state information includes a class hierarchy table.

4. The computer-implemented method of claim 1, wherein the specified criteria includes a syntax criteria based at least in part on a syntax of the first code segment.

5. The computer-implemented method of claim 4, wherein the specified criteria includes a syntactic match of the first code segment.

6. The computer-implemented method of claim 4, wherein the specified criteria includes a rule describing a semantic match of the first code segment.

7. The computer-implemented method of claim 1, wherein the querying process comprises:
   identifying a candidate code segment based on semantic matching of the candidate code segment to the first code segment;
   retrieving a context code segment from application code that precedes and succeeds the first code segment;
   retrieving a result-context code segment from application code that precedes and succeeds the candidate code segment; and
   identifying the candidate code segment as the second code segment based on fuzzy matching of the result-context code segment to the context code segment.

8. The computer-implemented method of claim 7, wherein the querying process includes generating a data structure of candidate code segments, wherein an arrangement of the data structure is based at least in part on respective degrees of similarity between the first code segment and each of the candidate code segments.

9. The computer-implemented method of claim 1, wherein the querying process includes limiting the search result to code segments having associated profile datasets.

10. The computer-implemented method of claim 9, wherein the generating of the extrapolated profile dataset comprises generating the extrapolated profile dataset for the first code segment based at least in part on a second profile dataset of the second code segment.

11. A computer program product for deriving profile data, the computer program product comprising one or more computer readable storage media, and program instructions collectively stored on the one or more computer readable storage media, the program instructions executable by a processor to cause the processor to perform operations comprising:
  requesting, by a compiler responsive to execution of a first code segment, a first profile dataset associated with the first code segment;
  executing, responsive to receiving an indication that the first profile dataset is not available, a querying process that searches other code segments based on specified criteria relating to an attribute of the first code segment;
  receiving a search result from the querying process, wherein the search result includes a second code segment;
  generating an extrapolated profile dataset based at least in part on the second code segment;
  storing the extrapolated profile dataset in memory such that the extrapolated profile dataset is associated in the memory with the first code segment; and
  performing, by the compiler, an optimization process on the first code segment based at least in part on the extrapolated profile dataset.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded over a network to a remote data processing system for use in a computer readable storage device associated with the remote data processing system, further comprising:
  program instructions to meter use of the program instructions associated with the request; and
  program instructions to generate an invoice based on the metered use.

14. The computer program product of claim 11, wherein the querying process searches only aggregate program state information and wherein the program state information includes a class hierarchy table.

15. The computer program product of claim 11, wherein the specified criteria includes a syntax criteria based at least in part on a syntax of the first code segment, and wherein the specified criteria includes a syntactic match of the first code segment.

16. The computer program product of claim 11, wherein the querying process comprises:
  identifying a candidate code segment based on semantic matching of the candidate code segment to the first code segment;
  retrieving a context code segment from application code that precedes and succeeds the first code segment;
  retrieving a result-context code segment from application code that precedes and succeeds the candidate code segment; and
  identifying the candidate code segment as the second code segment based on fuzzy matching of the result-context code segment to the context code segment.

17. A computer system comprising a processor and one or more computer readable storage media, and program instructions collectively stored on the one or more computer readable storage media, the program instructions executable by the processor to cause the processor to perform operations comprising:
  requesting, by a compiler responsive to execution of a first code segment, a first profile dataset associated with the first code segment;
  executing, responsive to receiving an indication that the first profile dataset is not available, a querying process that searches other code segments based on specified criteria relating to an attribute of the first code segment;
  receiving a search result from the querying process, wherein the search result includes a second code segment;
  generating an extrapolated profile dataset based at least in part on the second code segment;
  storing the extrapolated profile dataset in memory such that the extrapolated profile dataset is associated in the memory with the first code segment; and
  performing, by the compiler, an optimization process on the first code segment based at least in part on the extrapolated profile dataset.

18. The computer system of claim 17, wherein the querying process searches only aggregate program state information, and wherein the program state information includes a class hierarchy table.

19. The computer system of claim 17, wherein the specified criteria includes a syntax criteria based at least in part on a syntax of the first code segment, and wherein the specified criteria includes a syntactic match of the first code segment.

20. The computer system of claim 17, wherein the querying process comprises:
  identifying a candidate code segment based on semantic matching of the candidate code segment to the first code segment;
  retrieving a context code segment from application code that precedes and succeeds the first code segment;
  retrieving a result-context code segment from application code that precedes and succeeds the candidate code segment; and
  identifying the candidate code segment as the second code segment based on fuzzy matching of the result-context code segment to the context code segment.

* * * * *